(12) United States Patent  (10) Patent No.: US 7,624,633 B2
Nakada et al. (45) Date of Patent: *Dec. 1, 2009

(54) FLUID FLOW SENSOR AND FLUID FLOW MEASUREMENT DEVICE

(75) Inventors: Keiichi Nakada, Hitachinaka (JP); Junichi Horie, Hitachinaka (JP); Hiroshi Nakano, Hitachi (JP); Izumi Watanabe, Hitachinaka (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/854,130

(22) Filed: Sep. 12, 2007

(65) Prior Publication Data

US 2008/0250855 A1 Oct. 16, 2008

Related U.S. Application Data

(63) Continuation of application No. 11/206,820, filed on Aug. 19, 2005, now Pat. No. 7,270,000.

(30) Foreign Application Priority Data

Sep. 28, 2004 (JP) ............................. 2004-280804

(51) Int. Cl.
*G01F 1/68* (2006.01)
(52) U.S. Cl. .................................. 73/204.26
(58) Field of Classification Search ............... 73/204.26
See application file for complete search history.

(56) References Cited

U.S. PATENT DOCUMENTS

| 4,777,820 | A | * | 10/1988 | Hecht et al. | ............... | 73/204.26 |
| 6,626,037 | B1 | | 9/2003 | Wado et al. | | |
| 6,981,411 | B2 | * | 1/2006 | Konzelmann et al. | ..... | 73/204.26 |
| 7,137,298 | B2 | * | 11/2006 | Matsumoto et al. | ...... | 73/204.26 |
| 7,270,000 | B2 | * | 9/2007 | Nakada et al. | ........... | 73/204.26 |

FOREIGN PATENT DOCUMENTS

| DE | 100 10 020 A1 | 3/2001 |
| EP | 1 411 327 A1 | 4/2004 |
| EP | 1 452 838 A2 | 9/2004 |
| JP | 11-118553 A | 4/1999 |

OTHER PUBLICATIONS 1 sheet of Form PTO-892 and 1 sheet of Form PTO-1449.
European Search Report dated May 19, 2008 (Seven (7) pages).

* cited by examiner

*Primary Examiner*—Harshad Patel
(74) *Attorney, Agent, or Firm*—Crowell & Moring LLP

(57) ABSTRACT

A thermal-type fluid flow sensor comprises a heating resistor formed on a thin film of a substrate, and plural thermal sensitive resistors configuring a bridge circuit. The thermal sensitive resistors are disposed on the thin film of the substrate so as to be located on an adjacent upstream side and an adjacent downstream side of the heating resistor in a stream direction of fluid to be measured. Resistor traces for the thermal sensitive resistors are formed so that the respective thermal sensitive resistors exhibit substantially equal changes in resistance with each other to distortion caused in the thin film.

20 Claims, 7 Drawing Sheets

FLUID FLOW SENSOR AND FLUID FLOW MEASUREMENT DEVICE

CLAIM OF PRIORITY

The present application is a continuation of prior U.S. patent application Ser. No. 11/206,820, filed Aug. 19, 2005, the entire disclosure of which is incorporated herein by reference, which in turn claims priority from Japanese application serial no. 2004-280804, filed on Sep. 28, 2004.

BACKGROUND OF THE INVENTION

The present invention relates to a fluid flow sensor for measuring a fluid flow rate by using a heating resistor and, for example, to a fluid flow measurement device suitable for a measurement of an intake airflow rate of an internal combustion engine.

Of various types of the fluid flow sensors that are, for example, disposed in various intake air passages of internal combustion engines in automobile cars etc., a thermal type fluid flow sensor has come into widespread use because of their capability to directly sense mass air flow rate.

In such thermal type fluid flow sensors, especially, those by using a sensor elements manufactured by semiconductor micromachining technology, which are provided on the semiconductors substrate such as silicon (Si), are advantageous in terms of economical mass-producibility, and low-power driving with size reduction. Therefore, thermal type fluid sensor using a sensor element based on this semiconductor technology has gained the spotlight in recent years. Such fluid flow sensors are described in Japanese Patent Laid-Open No. 2002-48616 (Patent Document 1).

In the fluid flow sensor described in the Patent Document 1, sensing resistors as sensing elements are formed on a silicon substrate by interposing an insulating layer between the heating resistor and the thin film. In such a manufacturing process, a portion of the silicon substrate is removed to form a thin film (diaphragm portion) for thermally insulating the resistance. A heating resistor is formed on the thin film to be driven as a heater. Plural thermal sensitive resistors for measuring fluid flow is disposed on the thin film of the substrate so as to be located on an adjacent upstream side and an adjacent downstream side of the heating resistor in a stream direction of fluid to be measured. Fluid flow rate is sensed by a measuring difference of temperature between the upstream side thermal sensitive resistor and the downstream side thermal sensitive resistor. In the measuring method based on difference of temperature, the heating resistor is heated at a constant temperature and heating the thermal sensitive resistors at the upstream and at the downstream by heat conduction and heat transfer. In a case where the air flow rate is not present, the upstream side thermal sensitive resistor and the downstream side thermal sensitive resistor are theoretically heated identically, and the temperature difference therebetween is substantially zero. When the air flow rate is present, since the upstream side thermal sensitive resistance is cooled and the temperature is lowered, but the downstream side thermal sensitive resistance is little cooled because heated air flows through the down stream side resistance. Accordingly a temperature difference occurs between them. Since the temperature difference corresponds the air flow rate, the air flow rate can be sensed based on the amount of the temperature difference. Since the upstream side and downstream side thermal sensitive resistors change their resistance values in accordance with the respective temperatures, voltage signals in accordance with the flow rate can be obtained by utilizing the change of the resistance values.

Figure 1:
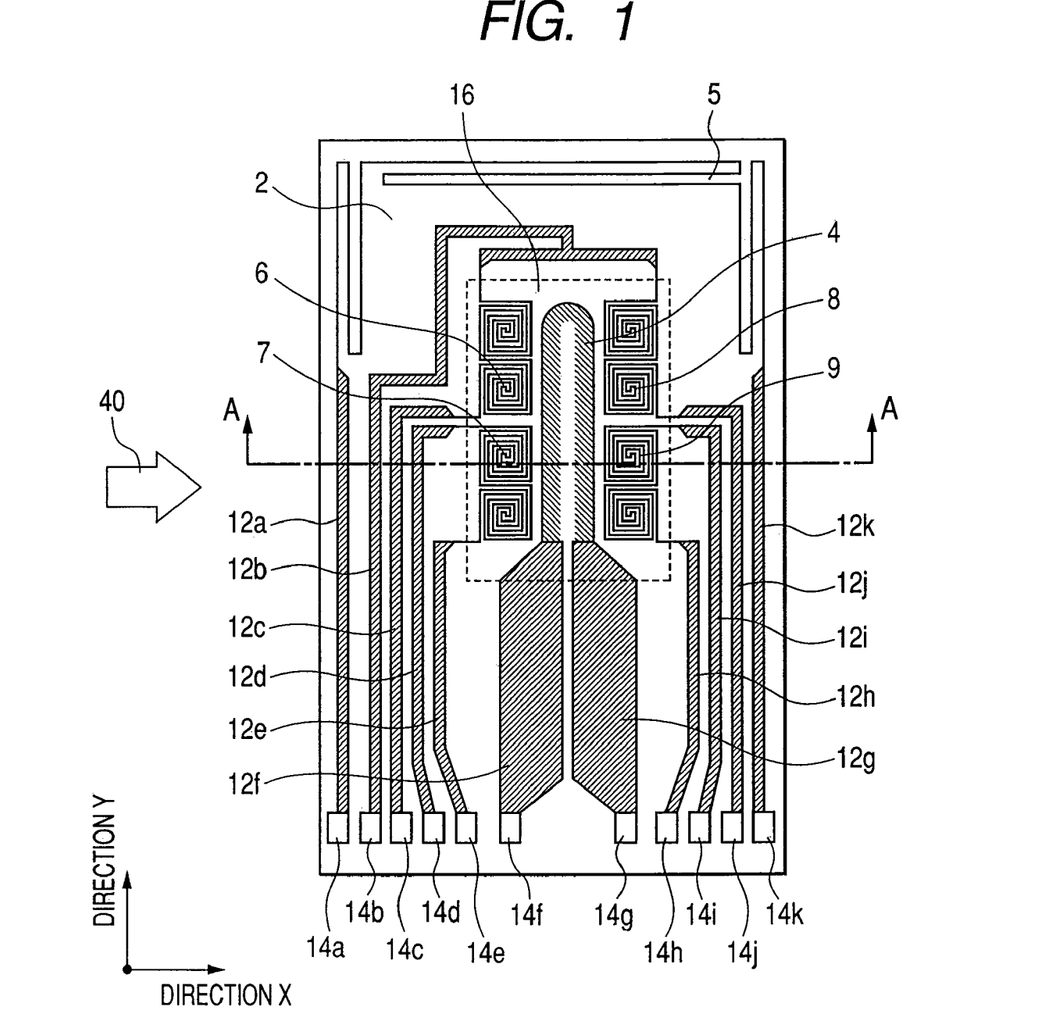
FIG. 1 is a pattern diagram of a flow sensing element showing a first example of the invention.
Figure 6:
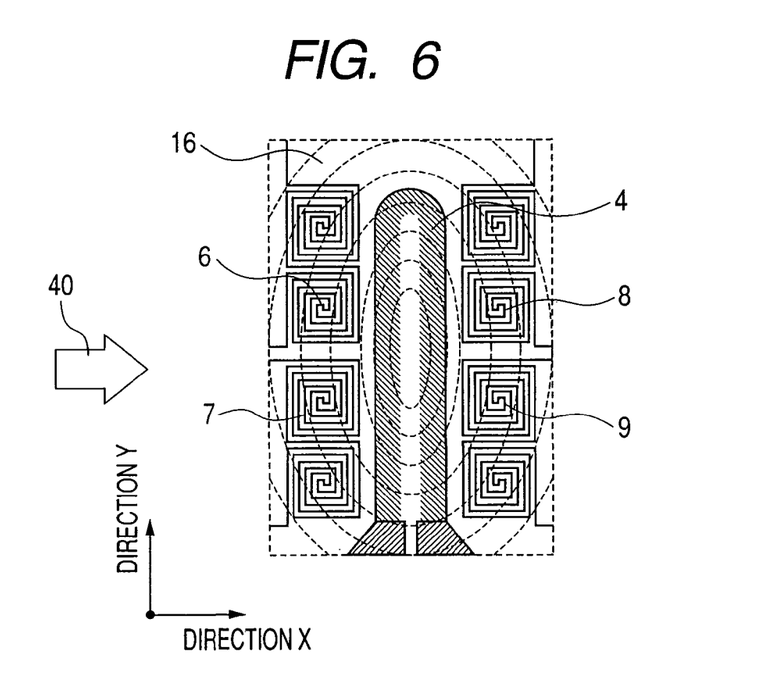
FIG. 6 is a schematic view showing the temperature distribution, on a thin film, of a heating resistor of the invention.

As shown in FIG. 1 and FIG. 6 of the Patent Document 1, by forming thermal sensitive resistors at the upstream and the downstream each by two pairs to form a bridge circuit, the sensor sensitivity can be doubled. Further, the measuring method based on the difference of temperature can detect the flowing direction of air. In a case where the air flow rate occurs in the direction opposite to that described above, the thermal sensitive resistor at the downstream is cooled. Accordingly, the circuit constitution shown in FIG. 6 of Patent Document 1 generates an output in the direction opposite to the point of zero flow rate. By the provision of the direction detecting means, the air flow rate can be measured more accurately than the fluid flow sensor not having the direction detecting means in a running state of causing an air flow in the directing from an engine to an air cleaner (reverse flow). In the prior art, pulsation of intake air increases at a low speed of 4-cylinder engines to often cause reverse flow near the full open state of a throttle. However, pulsation and reverse flow tend to occur at high speed to increase amount of the reverse flow in engine adopted for complicate control such as change of vale on-off time for coping with exhaust gas regulation and requirement for reducing fuel cost in recent years. Further, pulsative flow including reverse flow occurs also in a four or more multi-cylinder engine. Accordingly, the direction detecting function is an extremely effective means.

Further, thermal response at high speed to flow rate change can be obtained by forming such flow-rate measurement resisters on the thin film as diaphragm. In a case where a high-response fluid flow sensor is applied to the control of an automobile, it can response to the abrupt change of flow rate, or to the occurrence of pulsation in an air intake pipe. Accordingly, it is possible to measure the air flow rate more accurately than the fluid flow sensor of large heat capacity and at slow response speed.

The fluid flow sensor described above comprises mainly a flow sensing element, a basis for mounting the flow sensing element, a circuit for driving the flow sensing element and a case for mounting components described above and attached to an intake pipe for flowing intake air, and the flow sensing element is disposed in a bypass passage as a secondary passage.

SUMMARY OF THE INVENTION

In Patent Document 1, polycrystalline silicon is used as resistors for the flow sensing elements. A semiconductor material such as polycrystalline silicon has a piezoresistance effect that the resistance value changes due to distortion occurred by the deformation of the shape. The amount of the piezoresistance effect is determined by a gauge factor inherent to the material and this is found also in a metal material such as platinum.

The prior art involves a problem that the output abnormality due to the piezoresistance effect tends to occur easily. Since the thin film described above of the flow sensing element has only about 1 to 2 μm thickness, it undergoes various deformations due to:

(1) stress generated upon bonding the flow sensing element to a basis,
(2) stress generated upon bonding and mounting the basis to the case or the like,
(3) stress generated depending on the difference of linear expansion coefficient of mounted materials due to the change of the environmental temperature,
(4) thermal deformations due to heating resistor.

Particularly, the thermal sensitive resistors formed on adjacent upstream and downstream sides of the heating resistor have to be formed with narrow width and large length in view of the shape. Because it is desirable that the resistance value thereof is high in view of performance. Accordingly, they tend to suffer from the piezoresistance effect due to the stresses described above. For example, in FIG. 6 of Patent Document 1, while thermal sensitive resistors are formed each by two pairs on the upstream and the downstream, and bridge is formed by four temperature measurement resistances. However, since four resistances show different change of resistance values respectively due to the deformation of the thin film, output abnormality tends to occur.

Particularly, in recent years, measurement is necessary as far as an extremely low flow rate for lowering idling with an aim of decreasing the fuel cost and the output abnormality is particularly remarkable in the low flow rate region.

An object of the present invention is to decrease the fluctuation of signals from a bridge circuit in which thermal sensitive resistors are connected, even when the distortion occurs in the thin film of a substrate on which the heating resistor and the thermal sensitive resistor are disposed.

The foregoing object is attained in accordance with the inventions described in the claims.

For example, the foregoing object can be attained by a fluid flow sensor comprising: a heating resistor formed on a thin film of a substrate; plural thermal sensitive resistors configuring a bridge circuit and being disposed on the thin film of the substrate so as to be located on an adjacent upstream side and an adjacent downstream side of the heating resistor in a stream direction of fluid to be measured; wherein resistor traces as pattern elements for the thermal sensitive resistors are formed so that the respective thermal sensitive resistors exhibit substantially equal changes in resistance with each other to distortion caused in the thin film.

According to the invention, in a case where distortion occurs in the thin film of the substrate for the heating resistor or thermal sensitive resistor, fluctuations of the signals from the bridge circuit, in which the thermal sensitive resistors are connected, caused by the distortion can be decreased.

DESCRIPTION OF THE PREFERRED EMBODIMENTS

At first, a concept of an embodiment of the present invention is to be described briefly. Resistor traces as pattern elements for the thermal sensitive resistor formed to the thin film has a configuration capable of reducing the change (variation) of output due to the piezoresistance effect. In a case where the resistor trace is configured by connecting straight line potions in two or more directions each of an identical width, it is configured so that the sum for lengths of trace potions is substantially equal between each of the directions. Further, in a case where the pattern is configured by connecting straight line potions in two or more directions of different pattern width, it is configured so that L/W in each of the directions is substantially identical, assuming the pattern width in each of the directions as W and the sum for the trace length in each of the directions as L. With such a configuration, since the amount of change of resistance value is equal between each of the thermal sensitive resistors in a case where distortion occurs due to the stress in the flow sensing element, it can provide a configuration of less changing the output of the fluid flow sensor.

Then, embodiments of the present invention will be described specifically with reference to the drawings.

Figure 2:
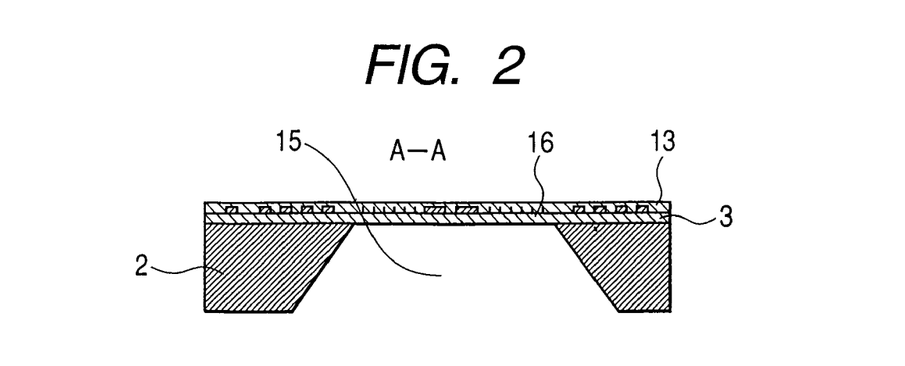
FIG. 2 is a cross sectional view of a flow sensing element showing a first example of the invention.

A flow sensing element 1 used in the present invention is to be described. FIG. 1 is a pattern diagram of a flow sensing element 1 showing a first embodiment of the present invention, FIG. 2 shows a cross sectional view of the flow sensing element 1 showing the first embodiment. The flow sensing element 1 is manufactured by a semiconductor production technique. This is to be described below. A silicon dioxide layer is formed as an insulating layer 3 on a single crystal silicon substrate 2 by way of a method such as thermal oxidation or CVD (Chemical Vapor Deposition), and a silicon nitride layer is formed by a CVD or like other method. Then, a polycrystalline silicon layer is formed by a method of CVD or the like, and phosphorus (P) as impurities is doped by thermal diffusion or ion implantation in order to obtain a desired resistance value. Subsequently, the polycrystalline silicon layer is patterned to form a heating resistor 4, an intake air-temperature compensating resistor 5, upstream side thermal sensitive resistors 6, 7, downstream side thermal sensitive resistors 8, 9, and lead resistance 12. Then, a silicon nitride layer and a silicon dioxide layer are formed as a protective layer 13 by a method such as CVD. Subsequently, the protective layer 13 is patterned to remove the protective layer 13 at a portion for forming electrodes 14. Then, after forming an aluminum layer as an electrode material, patterning is applied by etching to form electrodes 14. Finally, for forming a cavity 15, patterning is applied to the surface of the single crystal silicon substrate 2 on the surface not formed with the heating resistor 4. Then, the cavity 15 is formed by anisotropic etching. By forming the cavity, a region in which the heating resistor 4, the upstream side thermal sensitive resistors 6, 7 and the downstream side thermal sensitive resistors 8, 9 are disposed becomes a thermally insulated thin film 16 like a diaphragm. Since the silicon dioxide and polycrystalline silicon contain compressive stress and silicon nitride contains tensile stress, a thin film 16 with no distortion can be formed by stacking the materials each of an appropriate film thickness. Finally, it is divided into chips by dicing. The divided flow sensing element 1 has, for example, of about 5 mm longer side and about 2.5 mm of shorter side in a rectangle. Further, by the use of a substrate formed by cementing two sheets of single crystal silicon substrates oxidized at the surface, those resistors can also be formed by single crystal silicon.

Figure 3:
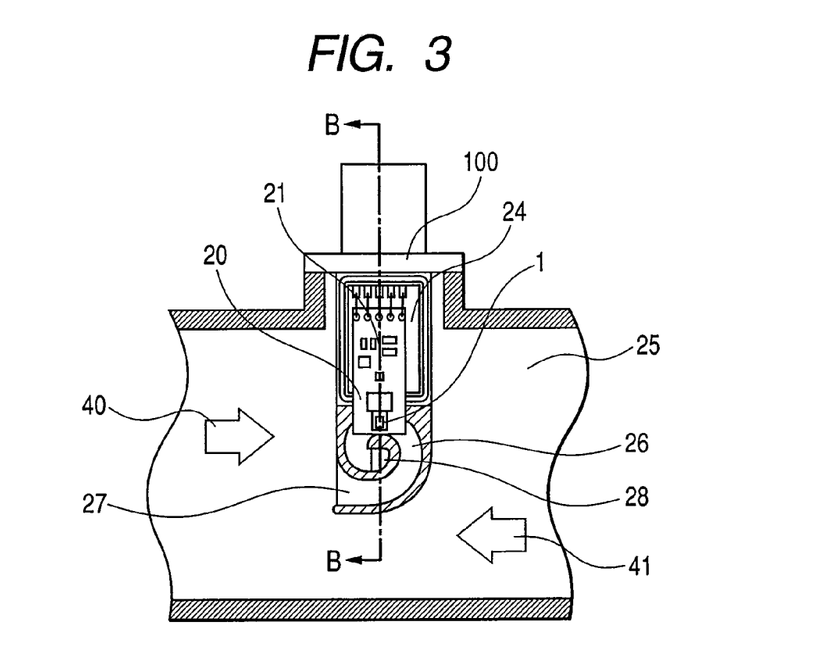
FIG. 3 is a fragmentary cross sectional view of a fluid flow sensor module mounting the flow sensing element of the invention.
Figure 4:
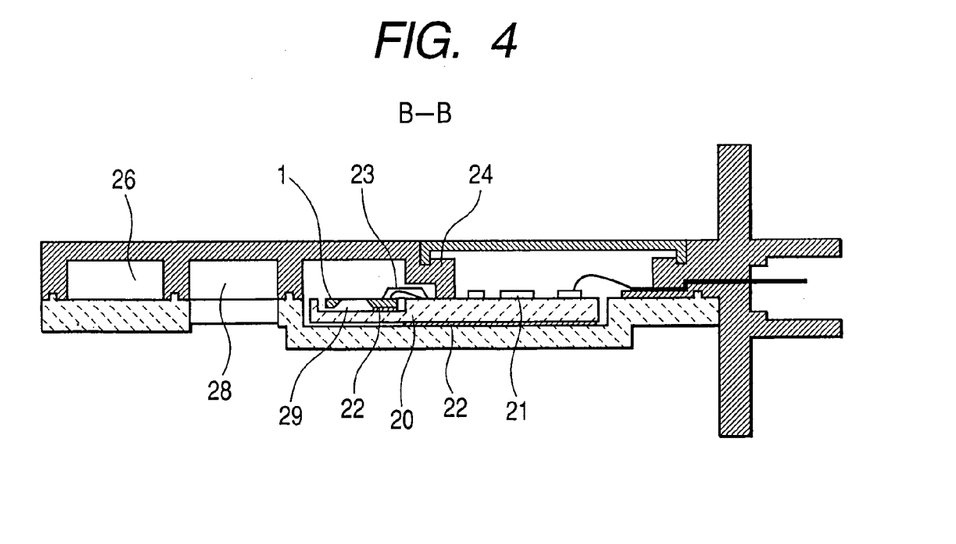
FIG. 4 is a fragmentary cross sectional view of a fluid flow sensor module mounting the flow sensing element of the invention.

Then, a configuration of a fluid flow sensor 100 is to be described with reference to FIG. 3 and FIG. 4. FIG. 3 and FIG. 4 are partial cross sectional views of a fluid flow sensor module in which the flow sensing element 1 according to the present invention is mounted. A basis 20 for mounting the flow sensing element 1 is formed by a laminated substrate made of glass ceramics. As the basis 20, high temperature calcination ceramics, metal plates, etc. may also be used. Especially, since it is desirable that the flow sensing element 1 is thermally insulated from peripheral members, use of a laminated substrate made of glass ceramics of low heat conductivity is effective. Further, by the use of the laminated substrate, a circuit 21 for feeding power to the flow sensing element 1, and processing signals from the flow sensing element 1 can be formed integrally in the basis 20. Since the number of parts can be decreased and the portion for bonding can be decreased by integrating the basis 20 and the circuit 21, it is advantageous in view of the cost reduction and the reliability. Further, since the size of the circuit 21 can be reduced by constituting the circuit 21 for controlling the flow sensing element 1 by using an inner layer conductor of the laminated substrate, the size of the fluid flow sensor 100 can be decreased.

The flow sensing element 1 is bonded on the basis 20 by way of an epoxy or silicone adhesive 22, and the electrode 14 of the flow sensing element 1 and the electrode of the basis 20 are electrically connected, for example, by connection wires such as gold wire 23, etc. The connection portion is covered with an epoxy or silicone resin so as to prevent electrolytic corrosion due to contaminants or moisture contained in intake air. The basis 20 on which the flow sensing element 1 is mounted is mounted by means of silicone adhesive 23 to a housing case 24. Further, the housing case 24 is inserted into a main passage 25 for passing fluid through. In FIG. 3, air flowing from the air cleaner to an engine (forward flow 40) is directed from an inlet 27 to an outlet 28 of a secondary passage 28. The secondary passage 28 in a scroll shape is formed by the housing case 24 and the basis 20 as shown in FIG. 4.

Figure 5:
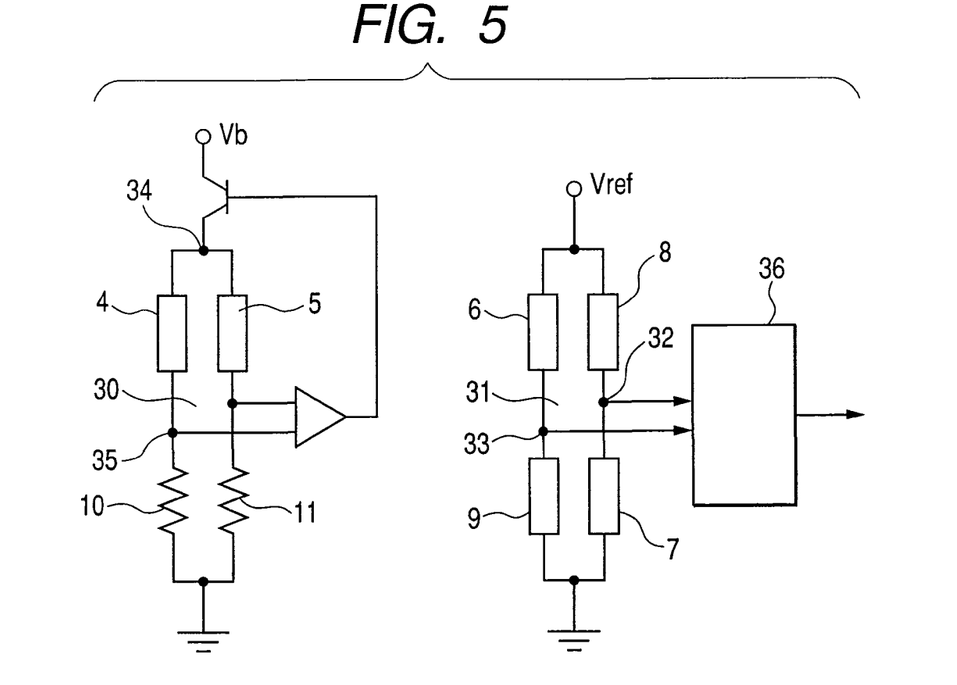
FIG. 5 is a driving circuit diagram in the invention.

The operation principle of the fluid flow sensor 100 is to be described with reference to FIG. 1 and FIG. 5. The heating resistor 4 constitutes the bridge circuit 30 together with the intake air-temperature compensating resistor 5, a resistance 10 and a resistance 11. The resistor 10 and the resistor 11 with respective fixed resistance are formed in the circuit 21 on the basis 20, or on the flow sensing element 1. The bridge circuit 30 is put to feed back control so that a temperature of the heating resistor 4 is higher by a predetermined temperature than that of the intake air-temperature compensating resistor 5. Since the heating resistor 4 generates heat depend on the heat insulative property of the thin film 16, the temperature is highest near the center of the thin film 16 and a temperature distribution of an elliptically radial profile as shown in FIG. 6 is formed. Four thermal sensitive resistors comprising upstream side thermal sensitive resistors 6, 7 and downstream side thermal sensitive resistors 8, 9 constitute the bridge circuit 31. A voltage Vref is applied to the bridge circuit 31. The upstream side thermal sensitive resistors 6, 7 and the downstream side thermal sensitive resistors 8, 9 are heated to a predetermined temperature by the heat conduction and heat transfer from the heating resistor 4. In a windless state, since the upstream side thermal sensitive resistors 6, 7 and the downstream side thermal sensitive resistors 8, 9 are theoretically heated identically, a difference of temperature between them is substantially at zero. Accordingly, center taps 32 and 33 are substantially at an equal potential. In a case where the air flow rate exists, since the upstream side thermal sensitive resistances 6, 7 are cooled and their average temperature are lowered, namely their resistance value are decreased. The downstream side thermal sensitive resistance 8, 9 is little cooled because heated air flows through the down stream side resistance. Accordingly, the upstream side thermal sensitive resistances 6, 7 become lower than that of the downstream side thermal sensitive resistor 8, 9., and a temperature different is produced in correspondence with the air flow rate. Thereby, a potential difference appears between the center tap 32 and the center tap 33. The potential difference is inputted to the micro-processing unit 36. A voltage relative to the air flow rate is outputted from the micro-processing unit 36.

Then, the resistance value of a resistor is generally represented as:

$$R = \rho \times L/A$$

in which R: resistance, ρ: specific resistivity, L: length, A: cross sectional area.

When distortion occurs to the resistance, the change coefficient of resistance is represented generally as:

$$dR/R = dL/L - dA/A + d\rho/\rho$$

In the resistor, the cross section expands or shrinks due to Poisson's ratio of the material relative to expansion or shrinkage in one direction. Accordingly, assuming Poisson's ratio as ν, it is defined as $$dR/R = (1+2\nu) \times dL/L + d\rho/\rho$$

In the right side of the formula described above, the first term represents the change coefficient due to geometrical deformation, and the second term represents the effect due to the change of the physical property, which is known as a piezoresistance effect in semiconductor materials.

The resistance value and the gauge factor of the polycrystalline silicon as the resistor material used for the present invention are determined by the impurity concentration. Generally, in the polycrystalline silicon:

(1) the resistivity is lower and the gauge factor is smaller in a case where the impurity concentration is higher, and
(2) the resistivity is higher and the gauge factor is larger in a case where the impurity concentration is lower.

In this case, it is necessary to adopt a high resistance value for the upstream side and downstream side thermal sensitive resistors. Because, if their resistance value are low, current flowing through those resistors increase, each self heat generation amount thereof increases. In order to suppress the self heat generation amount of the thermal sensitive resistors to such an extent as can be used sufficiently as the fluid flow sensor, it is desirable to restrict their current values to about 0.5 mA or less. In this case, when 5 V is applied as Vref, it is necessary that each of the thermal sensitive resistors is about 5,000 Ω or more. Accordingly, for forming a thermal sensitive resistor on a restricted thin film, it is necessary that the width of the thermal sensitive resistor is about 3 to 10 μm. While the self heat generation amount of the thermal sensitive resistor can be suppressed by lowering Vref, the difference voltage appearing between the center tap 32 and the center tap 33 is decreased and, accordingly, the sensitivity of the fluid flow sensor is lowered, which is not effective means.

In a case where the impurity concentration is increased in order to decrease the change in resistance due to distortion, the resistivity is also decreased, so that it is necessary to elongate and narrow the resistor pattern shape to make the resistance value higher. Therefore, the resistance tends to undergo the effect of distortion in view of the shape. On the other hand, in a case of lowering the impurity concentration in order to increase the resistivity, while the shape of the resistor pattern can be made wide and short, since the gauge factor is also increased, it also tends to undergo the effect due to distortion. Accordingly, the upstream side and downstream side thermal sensitive resistors tend to undergo the effect of distortion in any of the structure.

In a case where distortion occurs in the thin film 16 as the diaphragm, the resistance value of the polycrystalline silicon changes due to the piezoresistance effect as described above and, particularly, four thermal sensitive resistors in a fine straight line pattern undergo a most significant effect.

Since the four thermal sensitive resistor 6, 7, 8, and 9 form the bridge circuit 31, the voltage difference appearing between the center tap 32 and the center tap 33 has substantially the same value as in the case where the thin film 16 is not deformed when the amount of the resistance change of the four thermal sensitive resistors 6, 7, 8, and 9 is quite identical with each other, so that change of output scarcely occurs. However, in a case where the amount of resistance change is different among the four thermal sensitive resistors 6, 7, 8, and 9, since the potential difference appearing between the center tap 32 and the center tap 33 takes a value different from the case where the thin film 16 is not deformed, the output is changed to cause change of the flow rate characteristics of the fluid flow sensor 100.

The deformation of the thin film 16 as the diaphragm occurs by the stress on the flow sensing element 1. The flow sensing element 1 is bonded to the basis 20, and the basis 20 is bonded to the housing case 24. Since a thermosetting adhesive 22 is used for bonding, stress occurs inevitably after thermal curing, thereby its effect gives on the flow sensing element 1. Further, while the flow sensing element 1 is mounted in a recess 29 formed to the basis 20, it may be considered a case in which the flow sensing element 1 becomes in contact with the wall surface of the basis 20 that defines the recess 29. The flow sensing element 1 undergoes stress also in this case. Further, when the flow sensing element 1 and the circuit connection wires are resin-encapsulated, stress exerts an effect on the flow sensing element. Further, in the present embodiment, since the substrate of the flow sensing element 1 is formed of single crystal silicon, the basis 20 is formed of glass ceramics and the housing case 24 is formed of a plastic material, they have different linear expansion coefficients, respectively. Since the environmental temperature of automobiles change within a range of about −30 to 130° C. as described above, the flow sensing element 1, the basis 20, and the housing case 24 are deformed by expansion and shrinkage in accordance with the environmental temperature. Accordingly, the thin film is changed, for example, by relaxation of the stress effectuated initially on the flow sensing element 1. Such stress relaxation varies depending on the amount of the adhesives, the position and the state of adhesion for each of parts, etc. Thereby, the varieties of deformation and the amount of deformation of the thin film 16 also vary, for example, in the longitudinal, lateral, or twisting direction. Accordingly, the amount of the resistance change tends to take different values in the four thermal sensitive resistors 6, 7, 8, and 9, respectively.

Figure 7:
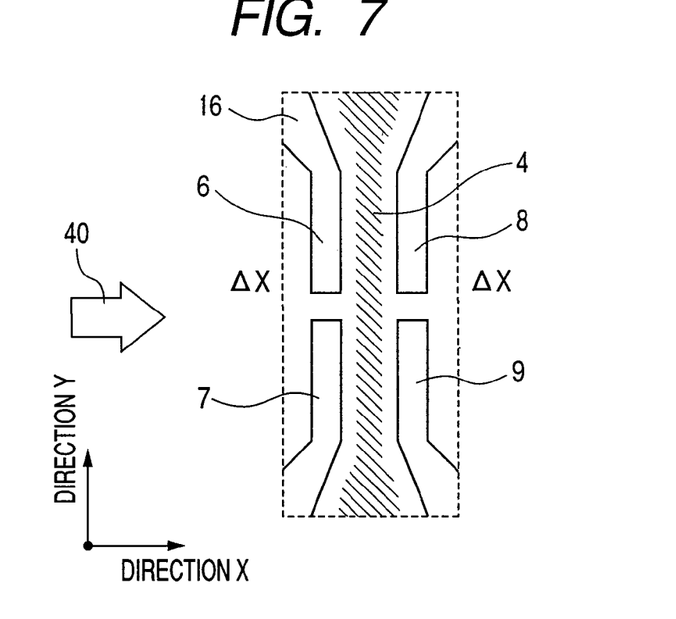
FIG. 7 is a pattern diagram of an existent flow sensing element.
Figure 8:
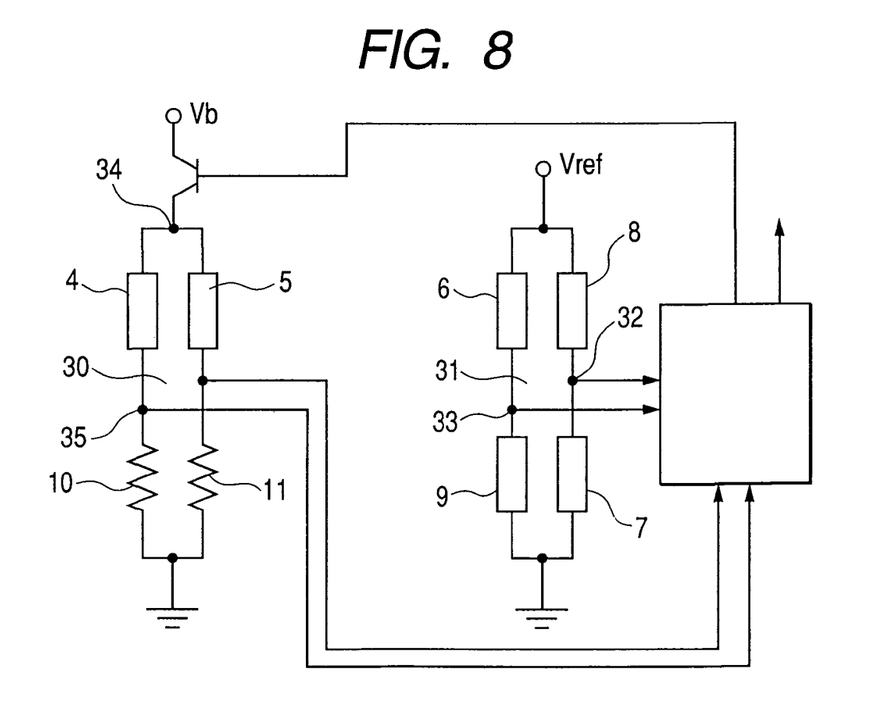
FIG. 8 is an existent driving circuit diagram.

Now, the subject in the prior art is to be described. FIG. 7 shows a schematic view of a thin film pattern in the flow sensing element described in the Patent Document 1, and FIG. 8 shows a schematic view for a driving circuit in the Patent Document 1. In the conventional art, each of the upstream side thermal sensitive resistors 6, 7 and downstream side thermal sensitive resistors 8, 9 has a curved shape which includes more components vertical to the forward flow 40 than the components parallel with the forward flow 40 of airflow. The gauge factor is different between the longitudinal direction and the lateral direction for the piezoresistance effect, and the direction (sign) of change of resistance is also different in polycrystalline silicon. Accordingly, since the flow sensing element of the prior art includes more component in one direction (direction perpendicular to the forward flow 40) of the resistance, the absolute value for the amount of change increases. In this case, voltage change tends to occur due to the change of the resistance of the thermal sensitive resistor at the center tap 32 and the center tap 33 and, accordingly, flow rate error occurs due to the deformation of the thin film. Further, when complicate deformation such as twisting occurs in the thin film, and a specified resistance is deformed in the four thermal sensitive resistors, an extremely large flow rate error occurs.

On the contrary, in the present invention, the effect due to the deformation of the thin film described above can be decreased greatly. The structure for decreasing the effect of the deformation is to be shown below.

In the first embodiment of the present invention, each resistor trace as a pattern element of the upstream side thermal sensitive resistors 6, 7, and the downstream side thermal sensitive resistors 8, 9 is configured so that: (1) the sum for the pattern length in the flowing direction (direction X) and (2) the sum for the pattern length in the direction perpendicular to the flow (direction Y) are substantially equal with each other. In the polycrystalline silicon, since the sign for the gauge factor is opposite between the longitudinal direction and the lateral direction as described above, such structure can easily mutually cancel changes of resistances in X, y directions due to deformation of the thermal sensitive resistor. Since it cannot be estimated how the thin film 16 deforms in the range of variation as described above, the configuration of making the length equal between the longitudinal direction and the lateral direction can most effectively decrease the absolute value for the amount of changes of the resistances.

Figure 9A:
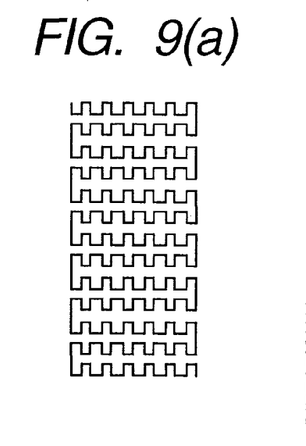
FIG. 9 is a pattern of thermal sensitive resistors of the invention.
Figure 9B:
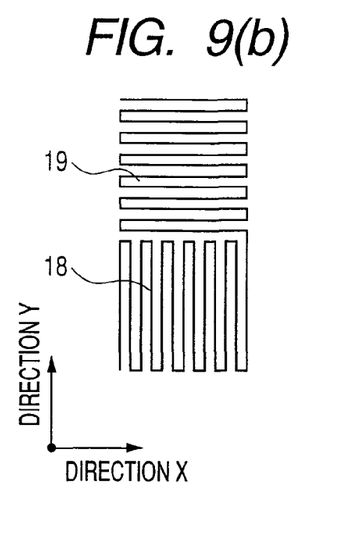
Figure 9C:
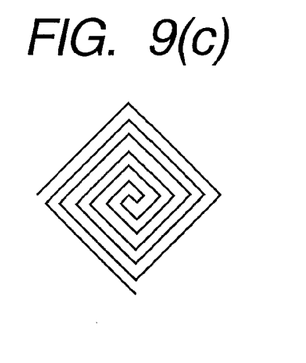

FIGS. 9(a) to (c) show other embodiment where a trace as a pattern element of a thermal sensitive resistor is different from that in FIG. 1, but the sum for the length of the resistor trace portion as in the direction X is substantially equal with the sum for that in the direction Y, as is the case with FIG. 1. Generally, in the semiconductor production process, the accuracy of a photomask for conducting the patterning, and the fabrication accuracy for the resistance is worsened more in the curved portion rather than in the straight portion. Accordingly, in a case of including many curved portions as shown in FIG. 9(a), since resistance values of the four thermal sensitive resistors 6, 7, 8, and 9 vary, one to each other, due to unevenness of quality in the manufacture, the variations of the characteristics of the fluid flow sensor due to the manufacture may possibly vary greatly. Accordingly, in a case of forming the pattern shown in FIG. 9(a), it is necessary to sufficiently ensure the photomask accuracy and the fabrication accuracy, which increases the production cost.

Further in resistor trace as a pattern element shown in FIG. 9(b), resistor trace portions elongating in the direction X (trace potion units in the direction X) and resistor trace portions elongating in the direction Y (units in the direction Y) of each thermal sensitive resistor are paired to constitute a thermal sensitive resistor. With the pattern of FIG. 9(b), the number of curved portions can be decreased to less than that in FIG. 9(a). However, there is a limit a size of the thin film, if thin film 16 is extended under such a limit, it is possible to occur a difference of the deformation between the trace potion units in the direction X and the trace potion units in the direction Y, and a flow rate error occurs in this case.

From the foregoings, in a case of making the length of the trace potions in the direction X and the length of trace potions in the direction Y substantially equal with each other, adopting the square-scroll trace shown in FIG. 9(a) and FIG. 1 is effective at suppressing the unevenness in quality of the manufacture. That is, in FIG. 9(a) and FIG. 1, the square-scroll trace is configured by integrating an inward square-scroll portion and an outward square-scroll portion which are connected with at the center. Further according to such a configuration, since the area of each thermal sensitive resistor can be decreased, the flow rate error due to the deformation in the thin film can be ever-more decreased.

Figure 10:
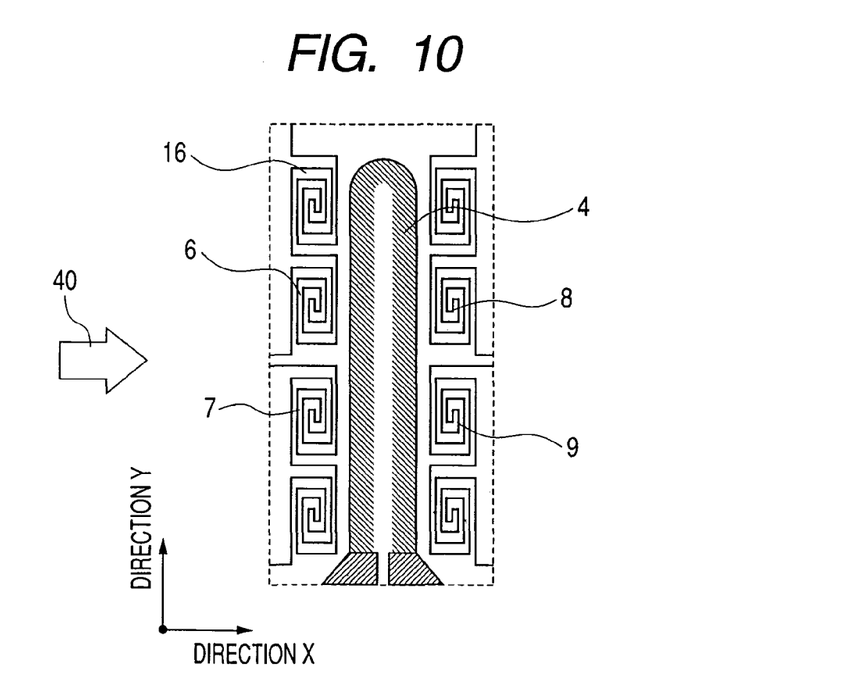
FIG. 10 is a pattern diagram of a flow sensing element showing a second example of the invention.

FIG. 10 shows a pattern for the thin film of a flow sensing element showing a second embodiment of the present invention. The thin film 16 has a thickness of about 2 to 3 μm and, as the distance is smaller in the shorter direction of the thin film 16, the strength is higher and the amount of deformation can be ever-more decreased. As described above, in a case where the distance in the shorter direction is small, it is difficult to constitute the square-scroll shape shown in FIG. 1 in view of the area for the thin film. In such a case, it is effective to adopt a configuration as shown in FIG. 9. That is, the trace widths of the thermal sensitive resistor potions in the shorter direction and the longitudinal direction are different from each other, but the ratio of each trace width and trace length is equal between the shorter direction and the longitudinal direction. Assuming the trace width in the longitudinal direction as Wa, the trace width in the shorter direction as Wb, the sum for the trace length in the longitudinal direction as La, and the sum for the trace length in the shorter direction as Lb, since the resistance component in the longitudinal direction and the resistance component in the lateral direction can be made equal with each other by constituting such that La/Wa and Lb/Wb are equal with each other, the same effect as that in the first example can be obtained.

Incidentally, the prior art also has a problem that the flow rate characteristics of the sensor change when the environmental temperature changes. This is to be described below. The thin film 16 of the flow sensing element 1 is formed with no distortion at an initial state after production the fluid flow sensor. However, when the fluid flow sensor 100 is driven, and the heating resistor 4 generates heat at 100° C. or higher, a temperature distribution as shown in FIG. 6 is formed to the thin film 16 during a windless state. The thin film 16 causes expansive deformation in accordance with the temperature distribution. In a case, where the heating resistor 4 is in a shape symmetrical with respect to the center of the thin film 16 as shown in the conventional example in FIG. 7, the deformation of the thin film 16 due to the heat generation of the heating resistor 4 is substantially symmetrical with respect to the center of the thin film 16. Accordingly, the amount of deformation of the four thermal sensitive resistors, which are disposed on both sides as adjacent upstream and adjacent downstream of the heating resistor 4, are substantially equal with each other to decrease the resultant error of flow rate. However, as described in Japanese Patent Laid-Open No. 2003-83788 and in the present embodiment, in a case where the heating resistor 4 is in a U-shaped configuration, deformation of the thin film 16 upon heat generation of the heating resistor 4 is asymmetrical with respect to the center of the thin film 16. Thereby, a difference tends to occur for the amount of deformation of the four thermal sensitive resistors 6, 7, 8, and 9 disposed on both sides of the heating resistor 4. Accordingly, flow rate error tends to occur. Apart of heat from heating resistor 4 is released via heat conduction in the wire lead region of the heating resistor 4. Therefore, the amount of heat received from the heating resistor 4 is different between the region where the upstream side thermal sensitive resistor 6 and the downstream side thermal sensitive resistor 8 are disposed and a region where the upstream side thermal sensitive resistor 7 and the downstream side thermal sensitive resistor 9 are disposed, so that the amount of deformation in the thin film is different depend on respective regions of the thermal sensitive resistors. Further, in a case where the flow rate exists, since temperature difference occurs between the upstream side thermal sensitive resistors 6, 7 and the downstream side thermal sensitive resistors 8, 9, the amount of deformation of the thin film is different. As described above, in a state where the fluid flow sensor 100 is operated, the amount of deformation of the four thermal sensitive resistors 6, 7, 8, and 9 are different respectively and, accordingly, the amount of resistance change is also different. In an automobile, since the environmental temperature in an engine room changes within a range from −30 to 130° C., the temperature distribution on the thin film 16 also changes in accordance therewith. Accordingly, since the amount of deformation of the thin film 16 changes depending on the environmental temperature, the characteristics of flow rate change in accordance with the environmental temperature.

Figure 11:
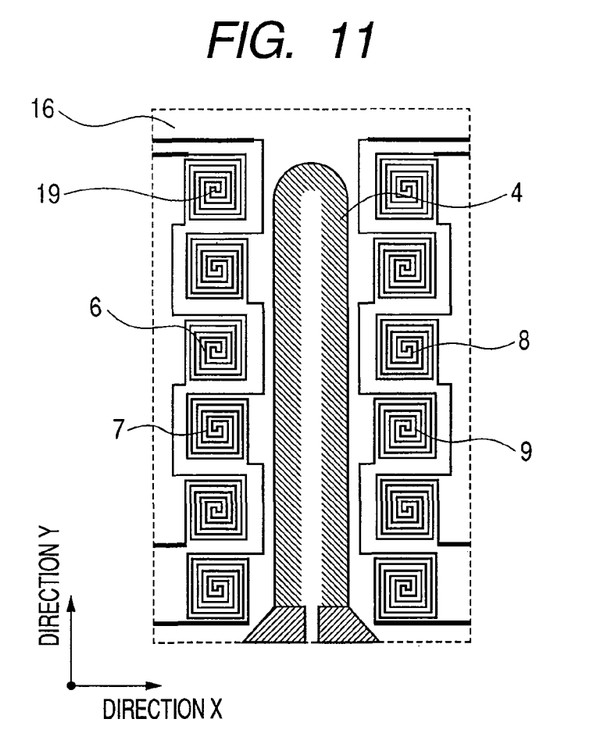
FIG. 11 is a pattern diagram of a flow sensing element showing a third example of the invention.

Also for the subject described above, the amount of change of characteristics can be decreased according to the first or second embodiment of the present invention. Further, with the configuration shown in FIG. 11, change of characteristics due to the change of the environmental temperature can be decreased more than that in the first and the second embodiment of the invention. Configuration of FIG. 11 is to be described. In FIG. 11, each of the thermal sensitive resistors have three square-scroll trace potions 19 as pattern elements, in which the square-scroll trace potions 19 for the upstream side thermal sensitive resistor 6 and the upstream side thermal sensitive resistor 7 are arranged alternately. The square-scroll trace potions for the downstream side thermal sensitive resistor 8 and the downstream side thermal sensitive resistor 9 are also arranged alternately. The configuration has an effect of making the average temperature for the upstream side thermal sensitive resistor 6 equal with the average temperature of the upstream side thermal sensitive resistor 7, and an effect of making the average temperature for the downstream side thermal sensitive resistor 8 equal with the average temperature of the downstream side thermal sensitive resistor 9. Accordingly the potential difference between the center tap 32 and the center tap 33 less changes and the change of the characteristics of flow rate can be decreased. Further, this is effective also for the deformation of the thin film due to the stress relaxation described previously. The difference for the amount of resistance change generated in each of the thermal sensitive resistors 6, 7, 8, and 9 is decreased to less than that in the first and the second examples of the invention. In this invention, while each of the thermal sensitive resistors has three square-scroll trace potions 19, they may be disposed by plural numbers other than three depending on the shape of the thin film 16.

Figure 13:
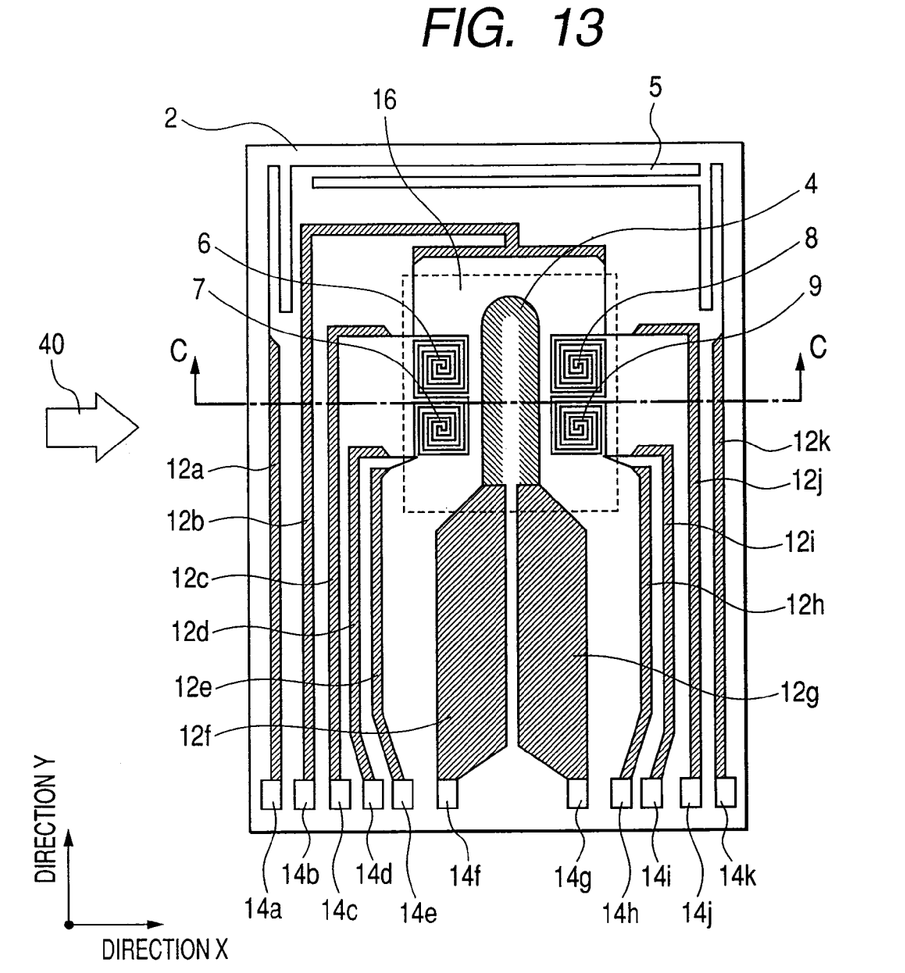
FIG. 13 is a pattern chart of a flow sensing element showing a fourth example of the invention.
Figure 14:
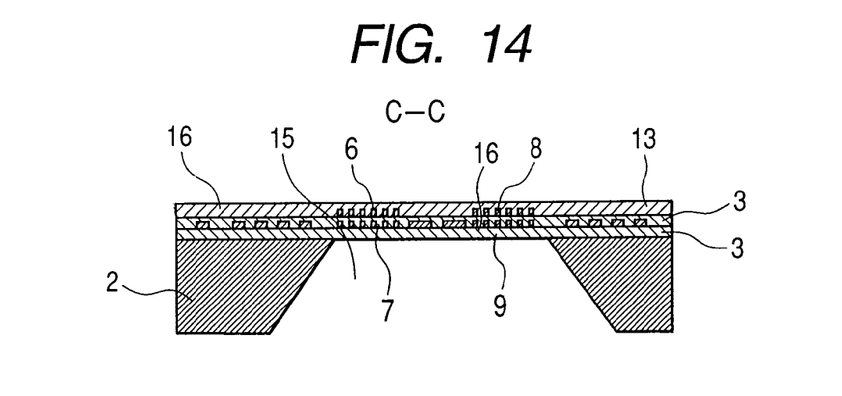
FIG. 14 is a cross sectional view of a flow sensing element showing a fourth example of the invention.

FIG. 13 and FIG. 14 show a fourth embodiment of the present invention. In the fourth embodiment, thermal sensitive resistors 6, 7, 8, and 9 are in a two-layered structure interposing insulating layer between resistors 6, 8 and resistors 7, 9 as shown in the cross sectional view of FIG. 14. In the embodiment, an upstream side thermal sensitive resistor 7 and a downstream side thermal sensitive resistor 9 are formed in a lower layer, while an upstream side thermal sensitive resistor 6 and a downstream side thermal sensitive resistor 8 are formed in an upper layer. These thermal sensitive resistors have also each square-scroll trace potion for a resistor pattern. Further, it is configured so that each of the thermal sensitive resistors 6, 8 in the upper layer and each of the thermal sensitive resistors 7, 9 in the lower layer substantially overlap with each other as viewed from the upper surface. With such a configuration, in a case where the thin film 16 is deformed, since the amount of deformation is quite identical between the upstream side thermal sensitive resistor 6 and the upstream side thermal sensitive resistor 7, the amount of change in resistance is also quite identical with each other. Further, this is applicable also to the downstream side thermal sensitive resistor 8 and the downstream side thermal sensitive resistor 9. Accordingly, since the amount of change is quite identical for the thermal sensitive resistors 6, 7, 8, and 9, this provides a configuration with least flow rate error due to the deformation of the thin film, compared with the first to third embodiments. Further, since the area of the thermal sensitive resistors 6, 7, 8, and 9 on the thin film 16 can be decreased, the area for the thin film 16 can be decreased and it is possible to improve the strength, decrease the deformation amount of the thin film, and decrease the size of the flow sensing element 1. Further, since each of the thermal sensitive resistors 6, 7, 8, and 9 comprises an electric conductor and, accordingly, they have a structure of interposing the insulating layer between conductors to form a capacitor and improve the resistance to electromagnetic waves.

Figure 12:
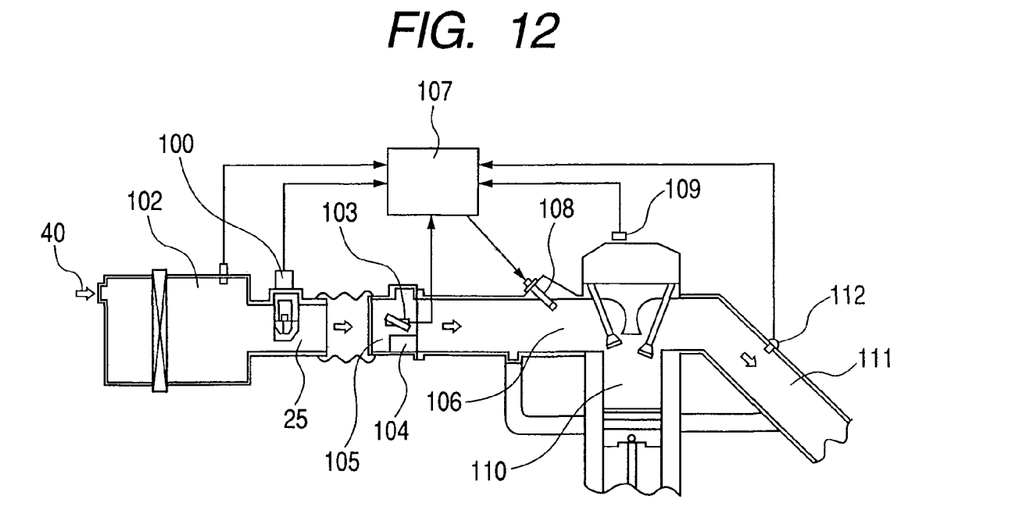
FIG. 12 is a system chart for an internal combustion engine using a fluid flow sensor of the invention.

FIG. 12 shows a system diagram of an internal combustion engine such as a gasoline engine. Air to be taken into the engine flows through a passage comprised of an air cleaner 102, a main passage 25, a throttle angle sensor 103, an idle speed control valve 104, a throttle body 105, and an intake manifold 106. In this air flow course, air flow rate and the flow direction are sensed by the fluid flow sensor 100 applied with the present invention. Sensed signals are taken in a vehicle control unit 107 as voltages or frequencies.

The flow rate signal is used for controlling a combustion section comprising an injector 108, a rotational speed meter 109, an engine cylinder 110, an exhaust manifold 111, and an oxygen densitometer 112 and a sub-system.

Although not illustrated, the basic configuration thereof in a diesel system is substantially identical with that of the gasoline system, and the fluid flow sensor of the present invention is applicable thereto.

Further, this technique is applicable also to a fluid flow sensor for measuring a fluid such as air or hydrogen in a system using a fuel cell.

According to those embodiments, the thermal sensitive resistors formed in the thin film have the following pattern. In a case where the trace as a pattern element of each thermal sensitive resistor has straight line potions with an identical width and with turns in two or more directions, the sum for the trace lengths of straight line potions in one direction is substantially equal to that in another direction.

On the other hand, in a case where the trace as a pattern element of each thermal sensitive resistor has straight line potions with turns in two or more directions and with different widths according to the respective direction, the following specifications are set. Assuming the width of each straight line in each of the directions as W and the sum for the trace lengths of straight line potions in each direction as L, L/W is substantially equal between the respective directions. With such a configuration, since the amount of change in resistance value for each of the thermal sensitive resistors is equal in a case where the thin film is deformed. It is capable of suppressing variance of the output of the fluid flow sensor. Since fluid measurement with high speed response and as far as low flow rate region is possible by the fluid flow sensor according to the present invention, control at high accuracy is possible by applying this to an internal combustion engine also under various running conditions. Further, by arranging the thermal sensitive resistors so that they less suffer from the effect of the temperature distribution of the heating resistor, it can provide an effect that the flow rate error less occurs even when the environmental temperature changes.

What is claimed is:

1. A thermal type fluid flow sensor comprising:
a heating resistor formed on a thin film of a substrate, and
plural thermal sensitive resistors configuring a bridge circuit and being disposed on the thin film of the substrate so as to be located on an adjacent upstream side and an adjacent downstream side of the heating resistor in a stream direction of fluid to be measured, wherein
a resistor trace for each of the thermal sensitive resistors is formed from a combination of two different direction-trace portions capable of substantially canceling out changes of their resistances to distortion caused in the thin film to each other, and
the heating resistor has a U-shaped configuration with a pair of ends arranged at one end side on the thin film so as to be connected to respective electrodes in the same orientation and a middle portion formed so as to make a U-turn at another end side on the thin film.

2. The fluid flow sensor according to claim 1, wherein a resistor trace for each of the thermal sensitive resistors is formed so that a change in resistance in one direction and a change in resistance in another direction substantially perpendicular to said one direction, resulting from distortion caused in the thin film, become substantially equal with each other.

3. The fluid flow sensor according to claim 2, wherein the thin film of a substantially rectangular shape is formed on the substrate, the heating resistor is formed on the thin film by interposing an insulating layer between the heating resistor and the thin film, the one direction is a longitudinal direction of the thin film, and the perpendicular direction is a shorter direction of the thin film.

4. The fluid flow sensor according to claim 1, wherein a resistor trace for each of the thermal sensitive resistors is comprised of plural square-scroll trace portions being connected in series.

5. The fluid flow sensor according to claim 1, wherein the plural thermal sensitive resistors are disposed by two on the adjacent upstream side of the heating resistor and by two on the adjacent downstream thereof, and the thermal sensitive resistors are formed of polycrystalline silicon doped with impurities.

6. The fluid flow sensor according to claim 1, wherein the heating resistor is included to a second bridge circuit different from aforementioned bridge circuit of the thermal sensitive resistors.

7. A fluid flow measurement device having a main fluid passage, and a secondary passage for measuring fluid flow rate, comprising:
the secondary passage having a curve;
a fluid flow sensor according to claim 1, disposed in the secondary passage; and
a processing circuit for processing signals from the fluid flow sensor element.

8. The fluid flow sensor according to claim 1, wherein the thermal sensitive resistors are disposed symmetrically relative to the heating resistor and connected electrically to each other to be formed as the bridge circuit.

9. The fluid flow sensor according to claim 8, wherein the thermal sensitive resistors disposed symmetrically are formed as a square-scroll shape respectively.

10. The fluid flow sensor according to claim 8, wherein the plural thermal sensitive resistors are disposed by two on the adjacent upstream side of the heating resistor and by two on the adjacent downstream thereof, and the thermal sensitive resistors are formed of polycrystalline silicon doped with impurities.

11. The fluid flow sensor according to claim 10, wherein the thin film of a substantially rectangular shape is formed on the substrate, the heating resistor is formed on the thin film interposing an insulating layer between the heating resistor and the thin film, the one direction is a longitudinal direction of the thin film, and the perpendicular direction is a shorter direction of the thin film.

12. The fluid flow sensor according to claim 8, wherein the heating resistor is included to a second bridge circuit different from aforementioned bridge circuit of the thermal sensitive resistors.

13. An airflow measurement device for an internal combustion engine having a main airflow passage, and a secondary passage for measuring airflow rate, comprising:
the secondary passage having a curve;
a fluid flow sensor according to claim 8, disposed in the secondary passage; and
a processing circuit for processing signals from the fluid flow sensor element, wherein
the inlet and the outlet of the secondary passage are disposed being inserted in the main air flow passage as an intake pipe for the internal combustion engine.

14. A control device for an internal combustion engine for controlling the amount of fuel fed to the internal combustion engine based on signals from the airflow measurement device according to claim 13.

15. A thermal type fluid flow sensor comprising:
a heating resistor formed on a thin film of a substrate, and
plural thermal sensitive resistors configuring a bridge circuit and being disposed on the thin film of the substrate so as to be located on an adjacent upstream side and an adjacent downstream side of the heating resistor in a stream direction of fluid to be measured, wherein
a resistor trace for each of the thermal sensitive resistors is formed so that the sum for the lengths of trace-portions in one direction is substantially equal with the sum for the length of trace-portions in another direction perpendicular to said one direction, and these resistor trace portions have substantially identical widths, and
the heating resistor has a U-shaped configuration with a pair of ends arranged at one end side on the thin film so as to be connected to respective electrodes in the same orientation and a middle portion formed so as to make a U-turn at another end side on the thin film.

16. The fluid flow sensor according to claim 15, wherein a resistor trace for each of the thermal sensitive resistors is comprised of plural square-scroll trace portions being connected in series.

17. The fluid flow sensor according to claim 15, wherein the plural thermal sensitive resistors are disposed by two on the adjacent upstream side of the heating resistor and by two on the adjacent downstream thereof, and the thermal sensitive resistors are formed of polycrystalline silicon doped with impurities.

18. The fluid flow sensor according to claim 15, wherein the heating resistor is included to a second bridge circuit different from aforementioned bridge circuit of the thermal sensitive resistors.

19. The fluid flow sensor according to claim 15, wherein the thin film of a substantially rectangular shape is formed on the substrate, the heating resistor is formed on the thin film interposing an insulating layer between the heating resistor and the thin film, the one direction is a longitudinal direction of the thin film, and the perpendicular direction is a shorter direction of the thin film.

20. A fluid flow measurement device having a main fluid passage, and a secondary passage for measuring fluid flow rate, comprising:
the secondary passage having a curve;
a fluid flow sensor according to claim 15, disposed in the secondary passage; and
a processing circuit for processing signals from the fluid flow sensor element.

* * * * *